United States Patent [19]

Patterson

[11] Patent Number: 4,778,494
[45] Date of Patent: Oct. 18, 1988

[54] CYCLONE INLET FLOW DIVERTER FOR SEPARATOR VESSELS

[75] Inventor: John C. Patterson, Plano, Tex.

[73] Assignee: Atlantic Richfield Company, Los Angeles, Calif.

[21] Appl. No.: 79,301

[22] Filed: Jul. 29, 1987

[51] Int. Cl.[4] .................... B01D 19/00; B01D 45/12
[52] U.S. Cl. ........................................ 55/177; 55/174;
55/204; 55/416; 55/424; 55/459.1
[58] Field of Search ................. 55/174, 176, 177, 184,
55/191, 204, 416, 424, 459 R

[56] References Cited

U.S. PATENT DOCUMENTS

| | | | |
|---|---|---|---|
| 2,664,963 | 1/1954 | Lovelady et al. | 55/174 |
| 2,822,060 | 2/1958 | Udovich | 55/459 R |
| 3,212,232 | 10/1965 | McMinn | 55/191 X |
| 3,212,234 | 10/1965 | McMinn | 55/174 X |
| 3,216,182 | 11/1965 | Cochran et al. | 55/416 X |
| 3,246,451 | 4/1966 | Glasgow | 55/174 X |
| 3,304,697 | 2/1967 | Ramsey | 55/459 R |
| 3,312,044 | 4/1967 | McCarter | 55/174 X |
| 3,722,184 | 3/1973 | McMinn | 55/174 |
| 3,900,300 | 8/1975 | Lehman | 55/184 |
| 4,208,196 | 6/1980 | Coggins et al. | 55/174 |
| 4,349,360 | 9/1982 | Schuurmans et al. | 55/424 X |
| 4,483,696 | 11/1984 | Zipay et al. | 55/204 X |
| 4,539,023 | 9/1985 | Boley | 55/174 |
| 4,617,031 | 10/1986 | Suh et al. | 55/177 X |

Primary Examiner—Robert Spitzer
Attorney, Agent, or Firm—Michael E. Martin

[57] ABSTRACT

A gas-liquid separator or slug catcher includes an inlet flow diverter for disposition in a separator vessel wherein the flow diverter includes a generally cylindrical inner wall member and a cylindrical cap having a depending wall spaced from and surrounding the inner wall member. The cap includes a transverse top wall which is spaced from the top edge of the inner wall to provide an overflow path for surges of liquid and/or gas. An inlet conduit extends to a tangential opening formed in the inner wall member for introducing fluid into an interior chamber. The inner wall member includes a transverse bottomplate which is provided with a series of openings around its periphery. Slugs of gas and two-phase liquid flow in a vortical manner in the diverter chamber whereby the gas is separated from the liquid mixture and some de-emulsification of liquid is accomplished through centrifugal forces. Deswirled liquid exits the apparatus through a bottomplate under the gas-liquid interface in the separator vessel. In an alternate embodiment of the apparatus, a series of circumferentially and longitudinally spaced perforations are formed in the inner wall member and the depending wall of the cap member.

10 Claims, 3 Drawing Sheets

CYCLONE INLET FLOW DIVERTER FOR SEPARATOR VESSELS

BACKGROUND OF THE INVENTION

1. Field of the Invention

The present invention pertains to a fluid flow diverter and separator particularly adapted for use in so-called slug catcher vessels for systems wherein three phase fluid flow comprising slugs of liquid in gas, or vice versa, must be treated to separate and stabilize the flowstream.

2. Background

The handling of multiphase fluid flowstreams, such as in the production of crude petroleum, requires fluid separation systems, sometimes known as separator trains, for separation of the crude oil from injected or connate gas and water. Many oil and gas wells tend to produce flowstreams which comprise slug flow of gas and liquid in the fluid transport conduit system. Accordingly, separation equipment must be provided upstream of the final stage separation processes which "catch" the slugs of fluid to stabilize the flowstream and to provide at least primary separation of gas from the liquid flowstream and primary separation of water or other liquids from the crude oil.

Several problems persist with prior art slug catcher and similar separation equipment. Conventional slug catcher equipment typically includes an elongated vessel in which primary separation of liquid from gas is provided and a liquid level is maintained to stabilize the flowstream for conducting the liquid flow to further treatment processes. The slug catcher vessel is typically provided with a flow inlet diversion structure adapted to minimize turbulence in the vessel and to enhance the multiphase fluid separation process by minimizing turbulation of the fluid stream so as to prevent gas entrainment or emulsification of one liquid in the other.

However, prior art systems, while in some cases being capable of operation under relatively steady state flow conditions, tend to cause recirculation, re-entrainment, and emulsification of fluids when subjected to the widely varying flow conditions which often must be dealt with in crude oil production flowstreams. It is to this end that the present invention has been developed with a view to providing an improved inlet diverter structure and slug catcher system for multiphase fluid flowstreams.

SUMMARY OF THE INVENTION

The present invention provides an improved apparatus for handling multiphase fluid flowstreams, including flowstreams characterized by so-called slug flow of gas and liquid.

In accordance with an important aspect of the present invention, a flow inlet diverter is provided for a slug catcher or separator vessel which provides for separation of water from oil and separation of gas from a water-oil or other liquid mixture entering the diverter and slug catcher vessel. The flow diverter structure is particularly tolerant of widely varying flow rates of liquid and/or gas slugs while minimizing agitation of the separated liquid in the slug catcher vessel. The improved flow diverter also provides at least primary separation of water or other more dense liquids from crude oil and separation of gas from the liquid flowstream.

The present invention contemplates the provision of a so-called cyclone or centrifugal flow type diverter structure having an inner cylindrical wall and an outer cylindrical cap member disposed around and over the inner cylindrical wall. Tangential inlet flow to the inner cylindrical member provides a swirling flow pattern which allows some separation of oil and water and substantial separation of gas from the inlet fluid flowstream. Under conditions of increased liquid flow rates, overflow of liquid is contained by the cap member to minimize agitation of the liquid present in the vessel.

In accordance with another aspect of the present invention, there is provided an inlet flow diverter for a fluid slug catcher or similar separator vessel wherein the diverter may operate at varying levels of liquid in the slug catcher vessel without agitating the liquid in the vessel and causing re-entrainment or remixing of separated liquids present in the vessel. In particular, an improved arrangement of a cyclone inner cylindrical wall member, a cap member, and a bottom plate having a peripheral set of fluid sublet openings adjacent to the cylindrical wall maintains the effectiveness of the inlet flow diverter with changes in liquid level in the slug catcher or separator vessel. A set of flow straightening vanes interposed between the cap member and the cylindrical wall reduces turbulence of the fluid flow leaving the inner chamber of the flow diverter.

Advantages of the inlet flow diverter include minimization of recirculation and re-agitation of the gas and liquid flow entering the diverter or already in the slug catcher vessel, effective operation over a wide range of liquid levels in the vessel, and minimal shear forces exerted on the incoming fluid, including rapid separation of the gas from the liquid so that minimal shearing of liquid occurs in the presence of gas. The flow diverter is also particularly advantageous in that it may operate in at least a partially submerged condition in the liquid present in the separator vessel.

Those skilled in the art will recognize the above described features and advantages of the present invention, together with other superior aspects thereof upon reading the detailed description which follows in conjunction with the drawing.

DESCRIPTION OF THE PREFERRED EMBODIMENTS

Figure 1:
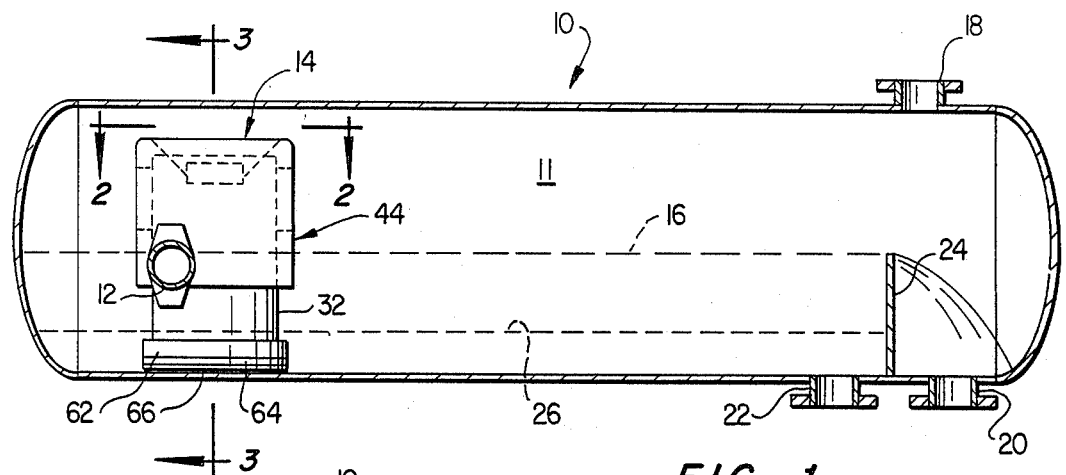
FIG. 1 is a longitudinal central section view of a slug catcher type of separator vessel, including the improved inlet flow treatment or diverter apparatus of the present invention.

In the description which follows, like parts are marked throughout the specification and drawing with the same reference numerals, respectively. The drawing figures are not necessarily to scale and certain features of the invention may be shown exaggerated in scale or in somewhat schematic form.

Figure 2:
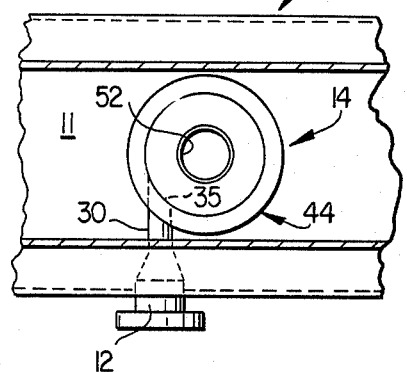
FIG. 2 is a detail view taken along the line 2—2 of FIG. 1.

Referring to FIGS. 1 and 2, there is illustrated an elongated separator vessel 10 which is typically adapted to be a first or early stage separator in a system for handling the flow of multiphase fluids, such as crude oil produced from subterranean wells. The vessel 10 is typically cylindrical in cross section and may have an overall length to diameter ratio of about five or six to one or greater. Multiphase slug flow of fluid is introduced to the interior 11 of the vessel 10 through an inlet conduit 12 which is connected to an improved inlet flow diverter and separator apparatus, generally designated by the numeral 14. The apparatus 14 is disposed within the interior space 11 in a manner in which at least a portion of the apparatus is normally submerged below a liquid level 16 forming an interface in the interior space 11 between liquid and gas which occupies the remainder of the interior space. A gas outlet conduit 18 opens into the space 11 and one or more liquid outlet conduits 20 and 22 are also typically provided for the vessel 10.

When it is necessary to provide separation of liquids of different density within the vessel 10, a weir 24 is preferably provided for separating oil from water at an interface 26. Accordingly, the outlet 20 is connected to means for handling the flow of oil out of the vessel 10 and the outlet 22 is connected to suitable means, not shown, for conducting water or other separated liquids out of the vessel 10. The vessel 10 may include a suitable coalescing or demisting structure, not shown, interposed in the space 11 between the apparatus 14 and the weir 24. The interfaces 16 and 26 represent typical liquid levels which are desired to be maintained in the vessel 10 during normal operations to utilize the vessel 10 to convert slug flow in a conduit connected to the inlet 12 to steady state flow for treatment of the fluids discharged from the vessel through the outlets 18, 20 and 22. However, for various reasons, the liquid level may rise or fall due to maintaining substantially constant downstream flow requirements.

Figure 3:
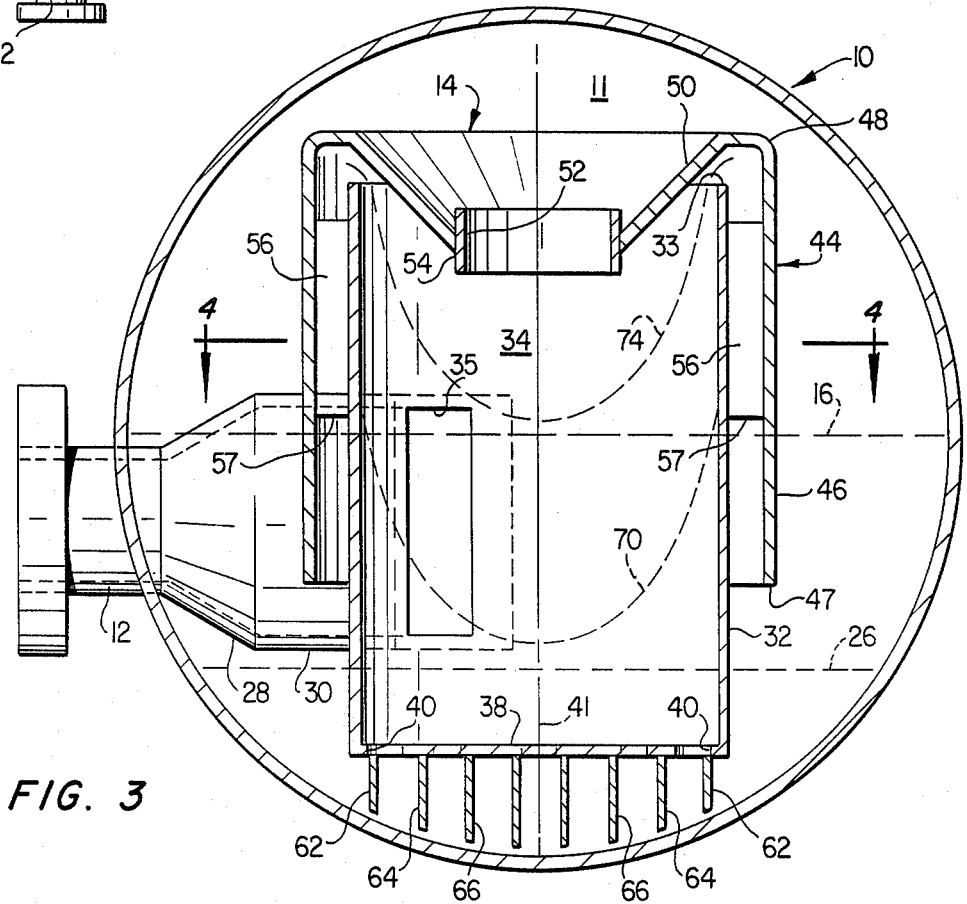
FIG. 3 is a section view taken along the line 3—3 of FIG. 1.

Referring now primarily to FIG. 3, the inlet conduit 12, which is of substantially cylindrical cross-section, is connected to a transition part 28 for changing the cross-section of the inlet conduit to a substantially rectangular conduit section 30 connected to the apparatus 14. The conduit section 30, having its major dimension extending vertically, viewing FIG. 3, is connected to a generally cylindrical inner wall member 32 of the apparatus 14 defining an interior space 34. The conduit section 30 provides a substantially tangential inlet opening 35 for admitting fluid flow to the space 34 tangentially along the interior surface of the wall member 32. The space 34 is delimited at the bottom of the wall member 32 by a bottom plate 38 having a plurality of peripheral cylindrical openings or holes 40 formed therein adjacent the surface of the wall member 32 and so as to leave a substantially solid plate portion near the central longitudinal axis 41 of the apparatus 14. The opposite end of the wall member 32 terminates at a perimeter edge 33.

Figure 4:
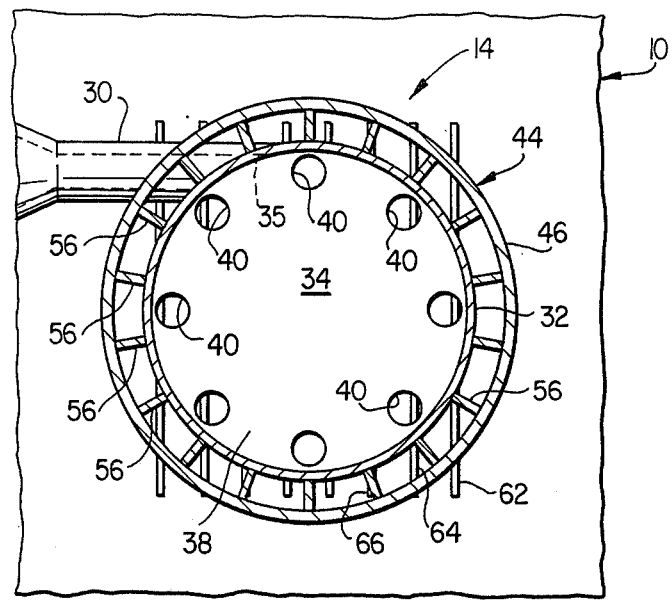
FIG. 4 is a section view taken along the line 4—4 of FIG. 3.

Referring further to FIGS. 3 and 4, the apparatus 14 includes a cap 44 having a cylindrical depending wall portion 46 surrounding the cylindrical wall member 32 and spaced therefrom in concentric relationship. The cap 44 includes a curved top portion 48 and a frustoconical wall portion 50 which terminates in an opening 52 centered on the axis 41. The opening 52 is delimited by a cylindrical drip ring or flange 54. The cap 44 is supported in relation to the wall member 32 by a plurality of generally vertically extending flow straightening and deceleration vanes 56, each of which depend generally from the edge 33 downward and terminate at a lower edge 57 spaced from a lower edge 47 of the cap member 44. The vanes 56 are adapted to suitably connect the cap member 44 to the wall member 32 such as by being welded or bolted to these members along opposed vertically extending edges of the vanes, respectively. The number of vanes 56 may vary but they are preferably spaced between 20 degrees and 30 degrees apart around the circumference of the cylindrical wall member 32. As shown in FIGS. 1 and 3, a second set of flow directing vanes comprising vanes 62, 64 and 66 extend longitudinally along the bottom of the separator vessel 10 directly below the bottom wall or plate 38. The vanes 62, 64 and 66 are adapted to cause the water and oil flowing through the openings 40 to be further deswirled and decelerated so that complete separation of the oil from the water may occur.

In operation, the inlet flow diverter or separator apparatus 14 is adapted to separate gas slugs from liquid slugs as well as entrained gas from inflowing liquid entering the space 34 through the inlet conduit 12 while accomplishing a relatively high separation efficiency over a widely varying flow rate. As shown in FIG. 3, a typical gas-liquid interface within the space 34, during operation of the apparatus 14, is indicated by the line 70 when the apparatus is operating at so-called design conditions. Under relatively steady state inflows of somewhat gasified liquids, the liquid enters the chamber 34 and flows along the inner wall surface of the cylindrical wall member 32 in a vortical manner. The centrifugal force acting on the mixture tends to effect separation of the gas from the liquid and to effect some separation or de-emulsification of liquids of different density, such as oil and water. By providing the liquid exit ports or openings 40 around the periphery of the bottom plate 38, a pressure differential is maintained which forces the liquid to flow out of the space 34 and through flow paths provided by the vanes 62, 64 and 66 wherein the liquid flow is substantially decelerated and enters the lower portion of the separator vessel 10 at or below the oil-water interface 26. Gas separated from the liquid flows through the opening 52 and into the upper regions of the space 11 for exit from the vessel 10 through the outlet 18.

In the event of increased flow rates of fluid entering the space 34, such as from a substantial liquid slug, the liquid level in the space 34 may rise to form a gas-liquid interface indicated by the dashed line 74. Under these conditions swirling liquid may spill over the edge 33. The swirling motion of the liquid is redirected to a generally vertical downward flow by the vanes 56. However, agitation of the liquid water and oil already separated and in residence in the vessel 10 is substantially minimized since the liquid leaving the flow path formed between the cylindrical wall member 32 and the cap 44 enters the vessel below the gas-liquid interface 16 and preferably close to the water-oil interface 26.

The advantages of the particular cyclone or centrifugal type inlet flow diverter apparatus 14 include minimal recirculation and reagitation of the gas and liquid flow which is provided by the bottom outlet plate having peripheral holes 40 which are formed only in a region which a positive pressure differential exists under normal operation of the apparatus to cause fluid to exit the space 34 at the bottom of the wall member 32.

A center outlet opening in the bottom plate 38 is not effective under high flow conditions because the centrifugal flow of the fluid entering the space 34 tends to create a low pressure zone along the axis 41 which would effect re-entrainment and mixing of fluid already separated and resting in the vessel 10.

Another advantage of the apparatus 14 includes effective operation over a wide range of liquid levels due to the height of the wall member 32 and the cap 44. By dimensioning the apparatus 14 to place the edge 33 above the maximum liquid level in the vessel 10, effective operation of the apparatus 14 is maintained with the maximum liquid level. Use of the apparatus 14 as an inlet flow diverter, particularly with a large diameter of the wall member 32, minimizes shear forces on the inflowing fluid to the space 34. This is partly accomplished also by reshaping the inlet flow from a generally cylindrical flowstream to a rectangular flowstream and by providing the opening 35 with its longitudinal or major dimension extending substantially parallel to the axis 41.

Typical dimensions for a diverter apparatus 14 for use in a vessel having a diameter of approximately 18 feet and an inflow rate of 300 MBPD at a gas to liquid ratio between 500 and 1500 SCF/Bb1 includes a diameter of the inner cylindrical wall member 32 of approximately 8.0 feet and a diameter of the cap 44 of approximately 10.0 feet. The overall height of the cap is approximately 9.5 feet and the overall height of the inner wall member is approximately 12.0 feet. The opening 35 preferably measures approximately 1.0 feet by 4.9 feet. The diameter of the openings 40 is approximately 0.9 feet. Tests with a 1/10 scale model of a diverter having the abovementioned dimensions operating on water and a mineral oil having a viscosity in the operating range approximating that of Prudhoe Bay crude oil indicates a separation efficiency of from 80% to 95% with respect to gas-liquid separation and wherein the liquid has from 5% to 25% water. The oil effluent quality for a liquid having initially 5% to 35% water indicates that separation of all but from 2% to 6.5% of water from the oil effluent is obtainable at a gas to liquid ratio of 1500 SCF/Bb1.

Figure 5:
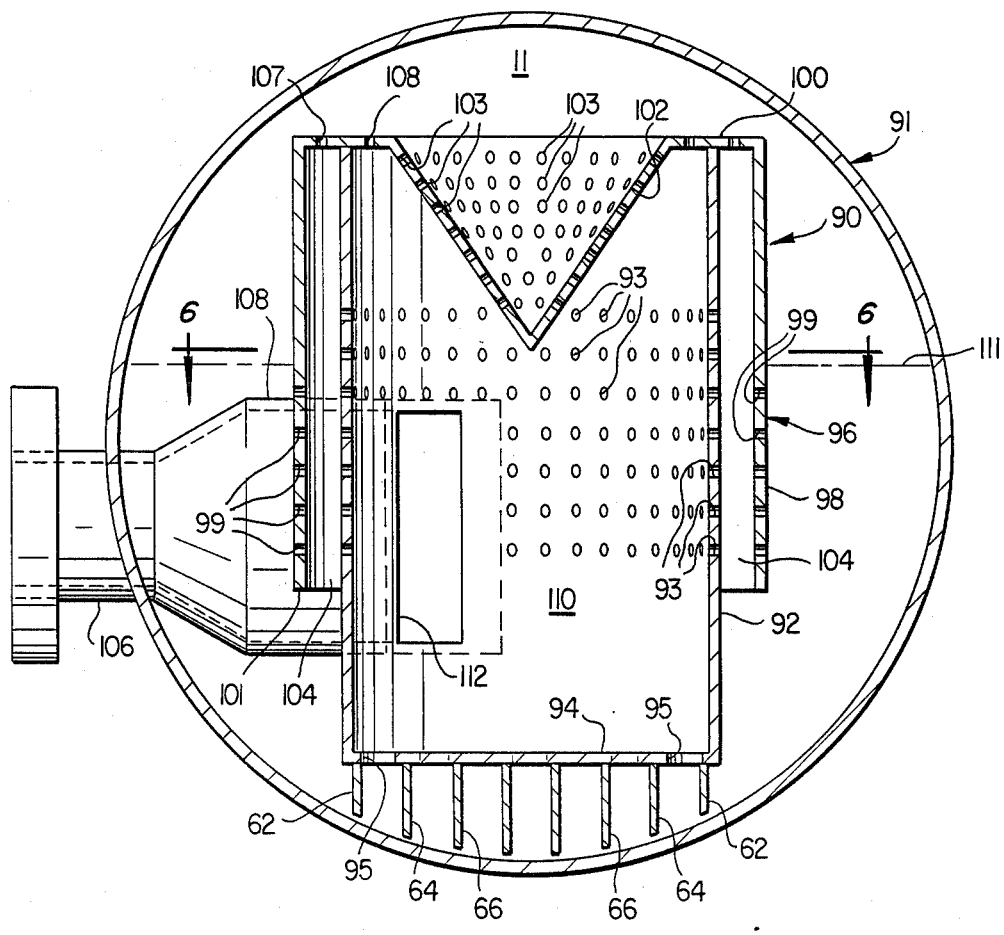
FIG. 5 is a vertical central section view of an alternate embodiment of an apparatus in accordance with the present invention.
Figure 6:
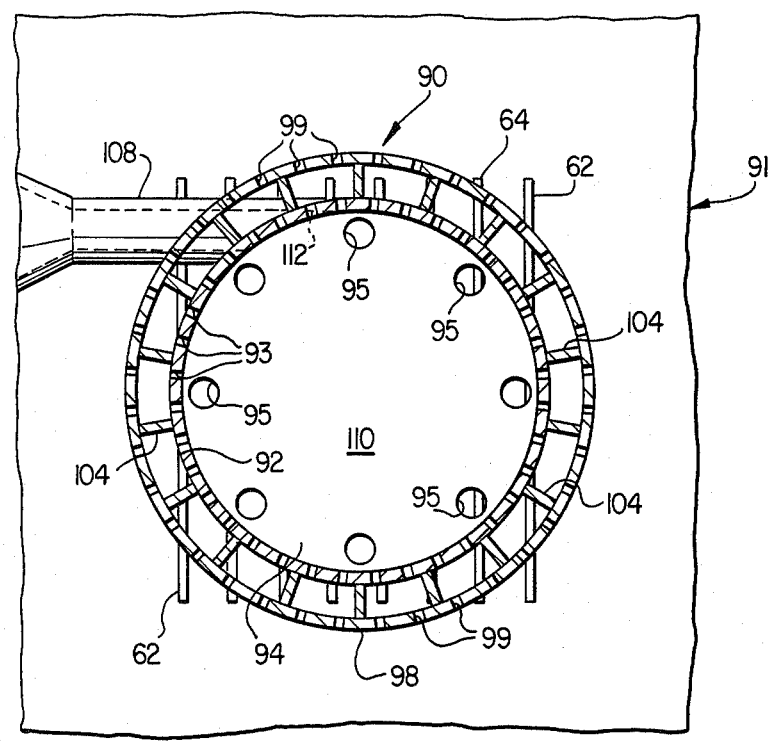
FIG. 6 is a section view taken along the line 6—6 of FIG. 5.

Referring now to FIGS. 5 and 6, an alternate embodiment of an inlet flow diverter in accordance with the present invention is illustrated and generally designated by the numeral 90. The diverter apparatus 90 is particularly adapted for use in foamy crude oil having a relatively low percentage of water cut in the liquid mixture. The diverter apparatus 90 has an inner cylindrical wall member 92, a transverse bottom plate 94 and a cap member 96 having a depending wall portion 98 arranged in concentric spaced relationship to the inner wall member 92. The cap member 96 has a transverse end wall 100 which supports a depending gas separation cone member 102. Peripheral radially projecting deswirl vanes 104 extend between the inner wall member 92 and the depending cap wall 98. A fluid inlet conduit 106 transitions from a circular configuration to a generally rectangular portion 108 and opens into an interior space 110 through a generally rectangular opening 112 in the inner wall member 92. The bottom plate 94 includes a series of peripheral circular openings 95 similar to the configuration of the apparatus 14. However, the apparatus 90 is configured such that the inner cylindrical wall member 92 is provided with a series of perforations 93 which extend vertically approximately 65% of the longitudinal extent of the inner cylindrical wall member 92 from the bottomplate 94. In like manner, the depending peripheral wall 98 of the cap 96 includes circumferentially spaced perforations 99 which extend approximately 50% of the longitudinal extent of the wall member from the bottom edge 101. The depending conical wall portion 102 is also perforated with a series of perforations 103 and perforations are provided in the top transverse wall 100 in a circular series of perforations 107 and 108, respectively.

The apparatus 90 is adapted to have approximately the same overall dimensions as the apparatus 14 and is adapted for applications wherein very low percentages of water are likely to be encountered in a crude oil which is somewhat gassy or foamy and is subject to flow conditions wherein alternate slugs of gas and crude oil are discharged into a separator vessel 91 containing the apparatus 90. A gas-oil interface 111, under design operating flow conditions, extends above the point at which the perforations 99 extend so that liquid would not be discharged into the area of the vessel 91 which would normally be occupied by gas or mist only.

In operation, the apparatus 90 creates a generally vortical flow path for the incoming liquid mixture stream in the chamber 110. Gas exits through the perforations 103, 107 and 108 and substantially degasified oil flows through the perforations 93 and 99. The deswirl vanes 104 prevent swirling motion of the oil as it enters the portion of the vessel 91 occupied by oil already in residence.

The flow diverter or separator devices 14 and 90 may be constructed of conventional engineering materials and, although preferred embodiments of apparatus for use in separator vessels or so-called slug catchers have been described herein in detail, those skilled in the art will recognize that various substitutions and modifications may be made to the specific flow diverter or separator devices described without departing from the scope and spirit of the invention as recited in the appended claims.

What is claimed is:

1. A system for separating gas from liquid under relatively widely varying flow rates of gas and liquid such as in the production of crude oil from subterranean wells, said system including in combination, a separator vessel including means for retaining a quantity of separated liquid at a normal liquid level in said separtor vessel above which is formed a gas collection space and means forming outlet conduits for said gas and said liquid, respectively, and inlet flow diverter apparatus disposed in said vessel and comprising:

a generally cylindrical, substantially vertically extending inner wall member defining an interior chamber, said inner wall member depending below said normal liquid level;

a fluid inlet conduit opening through said inner wall member into said chamber for discharging fluid comprising a gas-liquid mixture including slugs of gas and liquid at varying flow rates into said chamber;

a generally cylindrical cap member including a peripheral depending wall spaced from and surrounding said inner wall member and defining with said inner wall member a liquid overflow space for receiving liquid overflow from said chamber, said cap member including means defining a gas outlet opening for discharging gas from said chamber into said gas collection space of said vessel and said depending wall includes a bottom edge delimiting said liquid overflow space and disposed below said normal liquid level for discharging liquid overflow from said chamber to said quantity of liquid in said separator vessel;

means for supporting said cap member relative to said inner wall member; and means forming an opening into said chamber disposed below said normal liquid level for discharging liquid separated from said gas in said chamber into said quantity of separated liquid in said separator vessel.

2. The apparatus set forth in claim 1 wherein:

said inlet conduit includes a transition part for forming a generally rectangular inlet opening into said chamber and for dischraging fluid into said chamber substantially tangentially along an interior wall surface of said inner wall member.

3. The apparatus set forth in claim 1 wherein:

said means forming an opening for discharging liquid from said chamber comprises a transverse bottom plate and a plurality of openings formed in said bottom plate disposed substantially around the periphery of said bottom plate.

4. The apparatus set forth in claim 3 including:

a plurality of deswirl vanes extending transversely with respect to said inner wall member and below said bottom plate.

5. The apparatus set forth in claim 1 including:

a plurality of radially and longitudinally extending deswirl vanes spaced apart circumferentially around said inner wall member and extending between said inner wall member and said depending wall of said cap member.

6. The apparatus set forth in claim 1 wherein:

said cap member includes a generally transverse end wall defining a liquid overflow space between said end wall and a top edge of said inner wall member.

7. The apparatus set forth in claim 6 wherein:

said end wall depends into and delimits said chamber and said end wall includes means forming said gas outlet opening.

8. The apparatus set forth in claim 1 wherein:

said inner wall member includes a plurality of perforations extending peripherally and longitudinally in said inner wall member.

9. The apparatus set forth in claim 8 wherein:

said depending wall of said cap member includes a plurality of circumferentially and longitudinally spaced perforations formed therein and substantially below the normal liquid level in said vessel.

10. A system for separating gas from liquid under relatively widely varying flow rates of gas and liquid such as in the production of crude oil from subterranean wells, said system including in combination, a separator vessel including means for retaining a quantity of separated liquid at a normal liquid level in said separator vessel above which is formed a gas collection space and means forming outlet conduits for said gas and said liquid, respectively, and inlet flow diverter apparatus disposed in said vessel and comprising:

a generally cylindrical, substantially vertically extending inner wall member defining an interior chamber and depending below said normal liquid level;

a fluid inlet conduit including a transition part forming a generally rectangular inlet opening into said chamber for discharging fluid comprising a gas-liquid mixture including slugs of gas and liquid at varying flow rates into said chamber along an interior wall surface of said inner wall member;

a generally cylindrical cap member including a peripheral depending wall spaced from and surrounding said inner wall member and defining with said inner wall member a liquid overflow space for receiving liquid overflow from said chamber, said cap member including means defining a gas outlet opening for discharging gas from said chamber into said gas collection space of said vessel and said depending wall includes a bottom edge delimiting said liquid overflow space and disposed below said normal liquid level for discharging liquid overflow from said chamber to said quantity of liquid in said separator vessel;

a plurality of radially and longitudinally extending deswirl vanes spaced apart circumferentially around said inner wall member and extending between said inner wall member and said cap member; and means forming an opening into said chamber disposed below said normal liquid level for discharging liquid separated from said gas in said chamber into said quantity of separated liquid in said separator vessel comprising a transverse bottom plate and a plurality of openings formed in said bottom plate disposed substantially around the periphery of said bottom plate.

* * * * *